Nov. 17, 1931.  E. B. WILFORD  1,832,338
AIRCRAFT
Filed Jan. 15, 1929  2 Sheets-Sheet 1
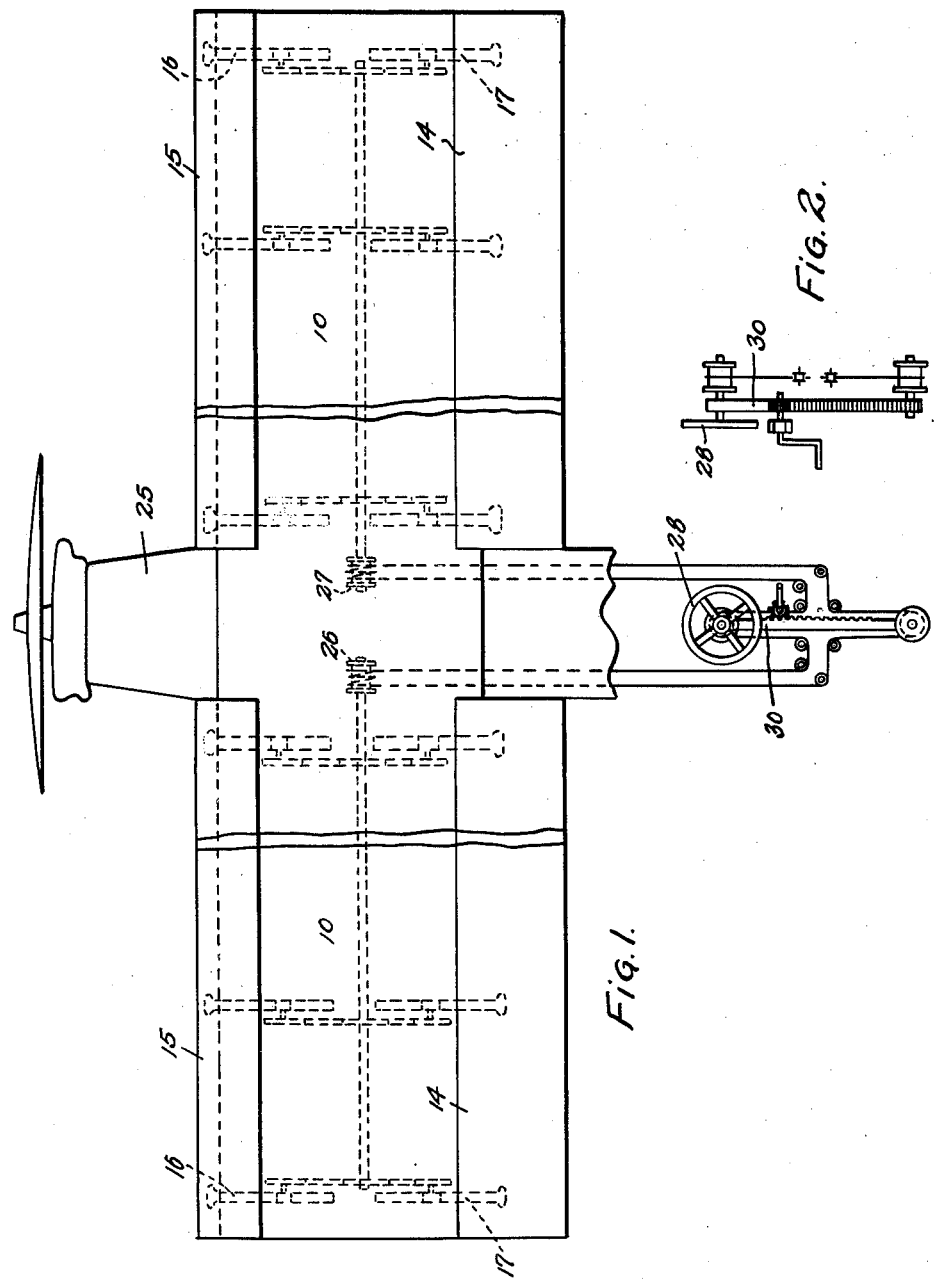
INVENTOR.
EDWARD BURKE WILFORD
BY
*Frank H Borden*
ATTORNEY.

Nov. 17, 1931.　　　E. B. WILFORD　　　1,832,338
AIRCRAFT
Filed Jan. 15, 1929　　　2 Sheets-Sheet 2
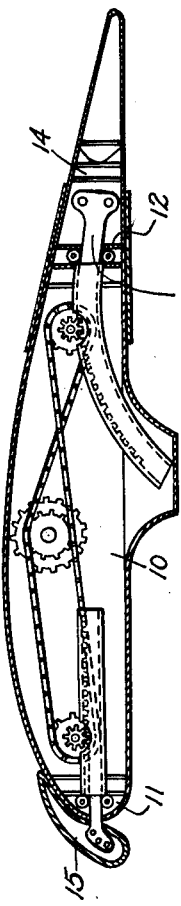
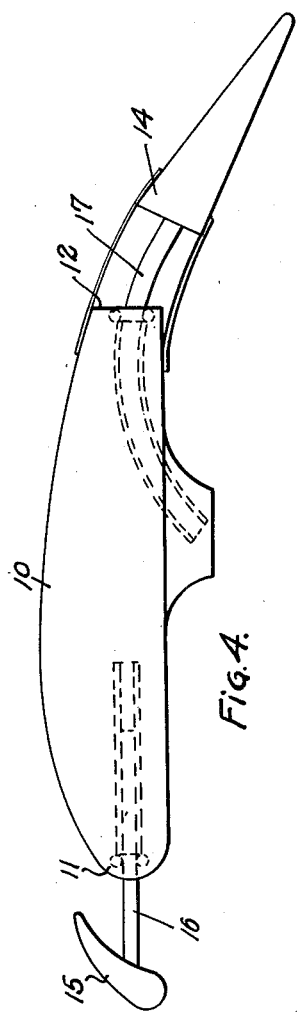
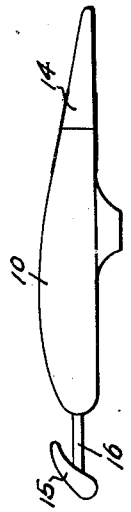
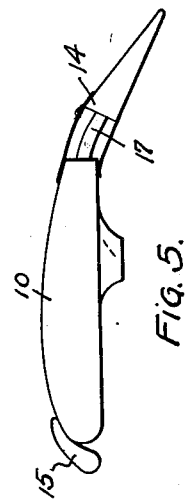
INVENTOR.
EDWARD BURKE WILFORD
BY
ATTORNEY.

Patented Nov. 17, 1931

1,832,338

UNITED STATES PATENT OFFICE

EDWARD BURKE WILFORD, OF MERION, PENNSYLVANIA

AIRCRAFT

Application filed January 15, 1929. Serial No. 332,593.

This invention relates to aircraft.

Among the objects of the invention are; to provide an airplane with wings having variable camber and area; to provide means utilizing changes in area and camber for lateral stability; to provide in connection with airfoils having means for varying the camber and area control means for securing a desired degree of adjustment as to area and camber; to provide in connection with airfoils of variable area and camber means securing a determined degree of adjustment on each side of fuselage and also operable to vary the relative adjustment for purposes of lateral stability; to improve the control mechanism for aircraft; to improve airfoils for aircraft, and many other objects and advantages as will become more apparent as the description proceeds.
The invention constitutes an improvement upon the variable camber and area invention described and shown in application Serial #240,850, filed December 17, 1927, of Vincent J. Burnelli, for aircraft.
In carrying out this invention I provide in an illustrative but preferred form an airfoil extending laterally on each side of a fuselage, the entering edges of which are extensible so as to provide a variable slot extending for substantially the width of the airfoil, the trailing edges of which are extensible but without forming a slot, with control mechanism such that the degree of the fore and aft extension of the entering and trailing edges may be determined and changed at will simultaneously, with additional controlling mechanism operable to effect relative changes in adjustments between the entering and trailing edge sections on each side of the fuselage whereby with the incident change in lift and drift or drag on opposite sides of the fuselage lateral stability is maintained, either in addition to or in place of that achieved by the ailerons.

In the accompanying drawings, forming part of this specification:

Fig. 1 represents a diagrammatic top plan of an airplane constructed in accordance with the invention, Fig. 2 represents a side elevation, of the manual control mechanism for securing the relative adjustment of the airfoil elements according to certain phases of the invention, Fig. 3 represents a transverse vertical section through an airfoil constructed according to this invention with the parts in such close coupled relation as to effect a high speed wing.

Fig. 4 represents a side elevation of an airfoil according to this invention with the parts extended in such manner as to effect a high lift, slow speed wing.

Fig. 5 represents a side elevation of a slightly modified form of wing according to this invention in which the trailing edge is extended to increase the camber and area of the wing, without any change in the entering edge, and Fig. 6 represents a further modified form of wing in which the entering edge flap has been extended to prevent burbling without changing the area and camber of the airfoil.

As shown in Fig. 3, the airfoil or wing comprises a rigid central section 10 closed at the front edge by the entering edge 11 of the standard contour for the particular wing section, and having a rear spar 12 against which the spar 13 of a trailing edge section 14 is arranged to abut, but which is extensible away from the central section 10. Nested against the true entering edge portion 11 of the rigid central section 10, is the extensible flap 15, movable relative the entering edge to provide an upwardly extending slot 16 to prevent burbling at the normal stalling angles in a manner that is well known. The trailing edge section is mounted on telescoping arms 17, normally housed in the central rigid section 10, and the entering flap 15, is mounted on telescoping arms 18, also housed in the central section, each sets of arms 17 and 18 being extensible from the central section under the influence of pinions 20 and 21, respectively, meshing with racks on the arms, and operated through suitable gearing, such as chain or cable 22 extending from the pinions to a gear or sprocket 23 mounted on a shaft 24 extending longitudinally through the wing.

It will be understood that the fuselage 25 has a wing according to this invention extending laterally from each side, and that the shafts 24 in each wing extend into the fuselage, or at least to points accessible or convenient relative the control mechanism to be described. Each shaft 24, at its inner end is provided with a drum or reel, respectively 26 and 27. An endless cable system is provided, in the preferred form, although it will be obvious that other forms of gearing may be employed, whereby the shafts 24—24 may be caused to rotate in the same direction to simultaneously extend the entering flap and the trailing edge on both wings, or which may cause the shafts 24 24 to be rotated in opposite directions for varying the relative lift of the opposite wings in order to secure lateral stability.

The control mechanism preferably includes a wheel 28, rotatably secured in a vertically adjustable housing 30 by means of a shaft 31, to the end of which a drum 32 is secured. At fixed points relative the vertically adjustable housing 30, are placed pulleys or rollers in pairs in order to guide the cables to be described, and at the lower end of the vertically adjustable housing 30, a pulley or roller 32 is journalled movable with the housing, and relative the fixed pairs of pulleys. The cable preferred may comprise a single cable, but it is preferred to consider the cable as in two parts. Thus a cable 33 is wound about and anchored to a drum on the end of shaft 24, as 26, and extends from this drum to the fixed guide roller 34, then about its mate of the pair, 34', upwardly and about the drum 32, to which it is anchored, then downwardly about guide rollers 35 and 35', to and about drum 27 on the end of its shaft 24, to which it is anchored. Extending from the lower portion of drum 26, a cable 36 wound about the drum 26 and anchored thereto, (and preferably in actual practice a continuation of cable 33), passing about the fixed guide rollers 37 and 37', about drum or pulley 32 then upwardly to the fixed guide rollers 38 and 38' to the lower side of drum 27 of shaft 24.

In order to secure simultaneous and identical changes in area and camber of both wings, a crank 40 is journalled at a fixed point, carrying a pinion 41 in mesh with a rack 42 on the vertically movable housing. It will be clear that rotation of the crank, and thus vertical movement of the housing, upwardly for instance will loosen the upper cables 33 on both sides of the fuselage, and simultaneously will tighten the lower cable 36 on both sides of the fuselage, thus causing the rotation of the drums 26 and 27 in the same direction. Thus the pilot may adjust the wings in accordance with the needs of the situation, to impart to both high lift and slow speed, as form a take off or landing, and may then return the cable system to a neutral position by proper directional movement of the crank. If it is desired to secure lateral stability by the means disclosed herein, the mere rotation of the wheel 28 causes opposite rotation of the drums 26 and 27, as will be clear, so that one wing will be caused to be possessed of more lift than the other, without the dragging effect normally incident to ordinary aileron controls at the higher angles of incidence, and thus the danger of spins is obviated.

In order to permit one wing to be completely coupled for high speed lifting effect only, while the other has the greater lift with slow speed desired, it may be necessary to provide a lost motion connection in the parts, as will be obvious.

It might be desired to provide the controls in such manner that either the entering flap, or the trailing edge, may be independently operated, as indicated in Figs. 5 and 6, and this is contemplated in the invention herein. Although not shown it will be clear that by providing independent shafts for operating these parts, and rendering one shaft operable with the crank, and the other by the hand wheel, that such differential movements may be secured.

It will also be apparent that by providing the entering flap as a disconnected pivoted portion opening automatically, such automatic actuation will occur when the trailing edge portion is extended rearwardly to shift the center of balance forward. To this extent the front slot may be automatically controlled through variations in the air pressure incident to movement of the rear element of the wing. Such construction is also to be construed as within the scope of this invention.

I claim as my invention:

1. Control mechanism for oppositely disposed variable chord and camber airfoils including a rotatable shaft in each airfoil arranged upon rotation to vary the chord and camber thereof, a manual control wheel, a movable housing in which the wheel is journaled, a secondary pulley on said housing movable with the control wheel, fixed rollers relative which the housing is movable, cables passing over said shafts, said rollers and said wheels and so arranged that movement of the housing causes rotation of the said shafts in the same direction to simultaneously vary the chord and camber of both airfoils, and rotation of the hand wheel causes differential or alternate rotation of the said shafts, to cause a decrease in the chord and camber of one wing while increasing that of the other.

2. In aircraft, a body, an airfoil extending laterally on each side of the body, means for providing a slot in the forward portion of each airfoil, and means for rearwardly extending the trailing edge section thereof, a shaft extending longitudinally of each airfoil, means operatively connecting the shaft with the first and second mentioned means, cable means operatively engaging the shafts and extending into the body, a control mechanism in the body including a vertically movable post, a wheel mounted toward the upper end of the post, a drum operatively associated with the wheel, a pulley mounted toward the lower end of the post, said cable means extending over the pulley and said drum and so arranged that vertical movement of the post simultaneously and equally moves said shafts, and rotation of the wheel effects opposite movements of the shafts, and means for vertically moving said post.

In testimony wherof I affix my signature.

EDWARD BURKE WILFORD.